UNITED STATES PATENT OFFICE.

RICHARD WOLFFENSTEIN, OF BERLIN, GERMANY.

ESTERS OF POLYHALOGEN COMPOUNDS OF ALCOHOLS WITH THERAPEUTICALLY-ACTIVE ACIDS.

1,072,289.   Specification of Letters Patent.   Patented Sept. 2, 1913.

No Drawing.   Application filed March 1, 1913.   Serial No. 751,642.

*To all whom it may concern:*

Be it known that I, RICHARD WOLFFENSTEIN, professor of chemistry, a subject of the German Emperor, residing at Berlin, Germany, have invented new and useful Improvements Relating to Esters of Polyhalogen Compounds of Alcohols with Therapeutically-Active Acids, of which the following is a specification.

Polyhalogen compounds of alcohols which by themselves generally have a strong anesthetic effect, have already been combined with acetyl-salicylic acid, important for therapeutic purposes, so as to form the corresponding esters. This manufacture is, however, troublesome, because the reaction must be carried out in the presence of substances adapted to combine with the hydrochloric acid which is liberated in the process.

I have found, that contrary to expectation the esterification of alcohols containing polyhalogens with acids having therapeutic properties, into whose phenol group no acid groups have entered, is substantially simpler and may be effected by merely heating the compounds. A very simple method consists, for instance, in combining salicylic acid as such with the alcohols or in producing the corresponding combination with cresotinic acid ether. For instance 95 grams of salicylic acid chlorid are heated with 101 grams of tertiary trichloro-butyl alcohol for about 1½ hours at 120 to 140° C. The salicylate of trichloro-butyl-alcohol thus formed, will on treatment of the reaction product with dilute soda solution and petroleum spirit (ligroin) dissolve in the latter and may be separated by crystallization. The compound crystallizes well and melts at about 81–82° C., it boils at 170° C. with slight decomposition, it is easily soluble in alcohol, soluble also in ether and petroleum spirit, but sparingly soluble in water. When treated with chlorid of iron, the solution of the ester in dilute alcohol assumes a violet color with a slightly reddish tint. When treated with concentrated sulfuric acid, the ester at first dissolves in it, but when the solution is heated, decomposition takes place, while hydrochloric acid vapors escape in large volumes.

According to Kopetschin chlorid of salicylic acid is obtained by causing thionyl-chlorid to act on neutral salicylates in the proportions of not more than one-half molecule of thionyl-chlorid to one molecule of salicylic acid. The applicant has also obtained salicylic acid chlorid by gradually introducing salicylic acid into thionyl-chlorid. Both of these methods yield good results. Salicylic acid chlorid at ordinary temperature is a colorless oil which boils at about 92° C. under a pressure of fifteen millimeters and on cooling solidifies to crystals, which melt again at about 12° C.

It is not necessary to start from ready-formed salicylic chlorid, but in order to produce the trichlorobutylsalicylic ester, 63 grams of salicylic acid may be heated with 75 grams of tertiary trichloro butyl alcohol and 30 grams of zinc chlorid for about 2 hours to a temperature between 100 and 110° C.

The separation or isolation of the compound takes place in the manner described above.

The combination of the paracresotinic acid with acetonechloroform yields acetonechloroform paracresotinic ester, which crystallizes well and melts at 97° C.

In the polyhalogen compounds of alcohols to be employed the halogen atoms are preferably arranged on one carbon atom.

The above compounds are intended for therapeutic purposes.

What I claim is:—

1. The process for the manufacture of salicylic trichloro-butyl-ester, which consists in heating salicylic acid chlorid with tertiary trichloro-butyl-alcohol, treating the product of the reaction with dilute soda solution and petroleum spirit, and allowing it to crystallize from the solution thus formed, substantially as described.

2. As a new product, salicylic trichloro-butyl-ester, being an easily crystallizable compound melting at 81–82° C., boiling at 170° C. with slight decomposition, easily soluble in alcohol, soluble also in ether and petroleum spirit, but sparingly soluble in water, assuming a violet color with slightly reddish tint, when treated in alcoholic solution with chlorid of iron, soluble in concentrated sulfuric acid and when heated in this solution, undergoing decomposition while giving off abundant vapors of hydrochloric acid.

In testimony whereof I affix my signature in presence of two witnesses.

RICHARD WOLFFENSTEIN.

Witnesses:
HENRY HASPER,
WOLDEMAR HAUPT.